(12) United States Patent
Milton et al.

(10) Patent No.: US 6,721,333 B1
(45) Date of Patent: Apr. 13, 2004

(54) POINT TO POINT PROTOCOL MULTIPLEXING/DEMULTIPLEXING METHOD AND APPARATUS

(75) Inventors: Lewis J. Milton, Glencoe, IL (US); Rajesh S. Pazhyannur, Palatine, IL (US); Irfan Ali, Northbrook, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/534,371

(22) Filed: Mar. 24, 2000

Related U.S. Application Data
(60) Provisional application No. 60/126,021, filed on Mar. 25, 1999.

(51) Int. Cl.[7] .................................................. H04J 3/16
(52) U.S. Cl. ........................................ 370/469; 370/465
(58) Field of Search ................................ 370/466, 465, 370/474, 477, 470, 400, 401, 392, 469, 471, 521, 412, 468, 349, 522, 524; 375/240; 709/246, 247; 341/51, 60

(56) References Cited

U.S. PATENT DOCUMENTS

| | | | | | |
|---|---|---|---|---|---|
| 5,978,386 | A | * | 11/1999 | Hamalainen | 370/466 |
| 6,041,054 | A | * | 3/2000 | Westberg | 370/389 |
| 6,134,245 | A | * | 10/2000 | Scarmalis | 370/474 |
| 6,160,808 | A | * | 12/2000 | Maurya | 370/389 |
| 6,198,735 | B1 | * | 3/2001 | Pazhyannur | 370/349 |
| 6,314,095 | B1 | * | 11/2001 | Loa | 370/252 |
| 6,370,118 | B1 | * | 4/2002 | Lioy et al. | 370/235 |
| 6,388,584 | B1 | * | 5/2002 | Dorward | 341/51 |
| 6,542,504 | B1 | * | 4/2003 | Mahler | 370/392 |
| 6,577,596 | B1 | * | 6/2003 | Olsson | 370/230 |

OTHER PUBLICATIONS

PPPmux—A new protocol for transporting small IP packets. R. Pazhyannur.*

"The Effect of CDMA Air staggering on Backhaul Delay with Constant Number of Mobiles", Rangsan Leela hakriengkrai, Rajesh S. Pazhyannur and Phil Fleming. Mar. 4, 1999, version 1.0. 7 pages.

"The PPP Internet Protocol Control Protocol (IPCP)", G. McGregor, May, 1992. 13 pages.

"The Point–to–Point Protocol (PPP)", W. Simpson, Jul., 1994. 47 pages.

"IP Header Compression over PPP", M. Engan, S. Casner, Feb., 1999. 9 pages.

"Compressig IP/UDP/RTP Headers for Low–Speed Serial Links", S. Casner and V. Jacobson, Feb., 1999. 22 pages.

"IP Header Compression", M. Degermark, B. Nordgren, and S. Pink, Feb. 1999. 42 pages.

* cited by examiner

*Primary Examiner*—Douglas Olms
*Assistant Examiner*—Ricardo M. Pizarro

(57) ABSTRACT

A multiplexing scheme creates multiplexed PPP packets and demultiplexes the multiplexed PPP packets to reduce packet overhead. A point to point protocol packet communication apparatus such as a suitably programmed processing device or other suitable structure includes a point to point protocol packet header compressor (600) (and/or decompressor) having an input that receives point to point packets (601), such as original UDP packets, and an output that outputs compressed PPP packets (602). The apparatus includes a PPP packet multiplexer (and/or demultiplexer) (603) operatively coupled to the output of the PPP packet header compressor (600), and operative to create a frame (604) containing at least: multiplexed PPP packets from the plurality of PPP packets (606, 608 and 610), PPP multiplexed identification data 614 and PPP packet delimitation data (612). To demultiplex the multiplexed PPP packets at a receiving end, a method and apparatus includes evaluating PPP packet delimitation data from the frame containing multiplexed PPP packets, PPP multiplexed identification data and PPP packet delimitation data; and demultiplexing the frame based on the PPP packet delimitation data to obtain separate PPP packets.

25 Claims, 6 Drawing Sheets

POINT TO POINT PROTOCOL MULTIPLEXING/DEMULTIPLEXING METHOD AND APPARATUS

CLAIM TO BENEFIT OF U.S. PROVISIONAL APPLICATION

The present application is based on Provisional U.S. application No. 60/126,021, filed on Mar. 25, 1999, which is hereby incorporated by reference, and priority thereto for common subject matter is hereby claimed.

FIELD OF THE INVENTION

The invention relates generally to Internet Protocol (IP) packet communication methods and apparatus and more particularly to point to point protocol (PPP) packet communication methods and apparatus.

BACKGROUND OF THE INVENTION

Internet Protocol (IP) based wireless communication architectures are known. As shown in FIG. 1, in the future the link between a base transceiver station (BTS) 100 and a selection/distribution unit (SDU) 102 will be based on IP that communicates point to point protocol (PPP) packets 101. The SDU may be part of a base site controller (BSC) or other suitable network element. The TIA/EIA/IS-634 standard (e.g., Part 4. Revision A "Core Protocol Details") defines the application protocols and the messages shared between the SDU and the BTS 100. These messages between applications 103 will be transported over an IP network 104. In the IS-634 standard, the interface between the SDU and the BTS is called the A3 interface. For the user traffic exchanged between the SDU and the BTS, IS-634 assumes that the transport layer provides the call-context information. This information is not included in the IS-634 message itself. Since the current system is circuit switched, the slot position in the connection between the BTS and the SDU provides this information and in the proposed packetized system, an AAL2 header provides the call-context information. In the IP based system, the unique call-context reference will be specified by using user datagram protocol (UDP) between the SDU and the BTS. A mobile station 105 communicates with the BTS 100 as known. The UDP port number along with the IP address will provide the unique call-context information. The protocol stack 106 between the SDU and the BTS is shown in FIG. 1. An SDU consists of multiple SDU elements. Each SDU element terminates one call. The following four tuple: (IP address of the SDU 108, Port number of the SDU 110, IP address of the BTS 112, Port number on the BTS 114), provides a unique call context for each leg of a call. The IP address and UDP port numbers provide the unique call-context for each IS-634 frames 116. A point to point protocol (PPP) header 118 and PPP CRC information 120 is also used.

In most of the current systems and systems which will be deployed for the next few years, a T1 1.544 Mbps link 122 forms the backhaul link from the BTS 100 to the core network. This link 122 is very expensive and should be able to carry data for as many calls as possible. Hence, the key problem is to compress the data and decrease the header overhead as much as possible. As known in the art, link 122 is terminated using Channel Service Units/Data Service Units (CSU/DSU) 124 and 126.

A standard way to carry IP packets over T1 links is to use point to point protocol (PPP) as a link layer protocol over the T1 link. In the default mode, PPP prepends 5 bytes of header and 2 bytes of trailer to each IP packet; thus the default PPP overhead is 7 bytes. When the two ends of the link negotiate to reduce the header of PPP, the PPP overhead can be reduced to 5 bytes: Flag byte+2-Protocol type bytes+2-CRC bytes. (it cannot be assumed that the protocol type field could be reduced to 1 byte, as the protocol byte field for compressed TCP and UDP payloads occupy 2 bytes). In addition UDP header compression is described by RFC 2508. In this case, the compressed UDP header is 2 bytes. Thus the overhead per IS-634 frame is 7 bytes—2 bytes compressed UDP header and 5 bytes PPP overhead. There is also a checksum feature of the UDP header. However, this PPP overhead can be unnecessarily large and can unnecessarily reduce the available bandwidth over the T1.

Another type of multiplexing scheme is described in ITU-T I.363.2, B-ISDN ATM Adaptation Layer: Type AAL2. This is a multiplexing scheme for point to point asynchronous transfer mode (ATM) virtual connections, whereby voice packets from multiple users may be contained in a single ATM cell payload 200. Each AAL2 user packet 202, 204, 206 that is multiplexed onto a given AAL2 virtual connection has a unique call-context reference, a Connection Identifier (CID). An example protocol stack 208 for this scheme is shown in FIG. 2.

Also, there have been several proposals for multiplexing real time transfer protocol (RTP) streams in the Internet. In the proposed designs, interest has also been expressed for reusing the RTP multiplexing scheme for improving the efficiency of transporting data on the BTS backhaul link. In the Internet, RTP multiplexing schemes have been proposed as methods to multiplex a number of low bit rate audio streams into a single RTP/UDP/IP connection between IP telephony gateways 300 and 302. The telephony gateways 300 and 302 may couple to Public telephone Networks (PTNs) 304.

The deployment scenario for these multiplexing schemes is shown in FIG. 3. The RTP multiplexing schemes are used to multiplex traffic between the two gateways 300 and 302 to transport data efficiently over the Internet. A requirement for the multiplexing schemes is that all the RTP streams 306, 308 being multiplexed originate and terminate at the same end-points, i.e. the IP address in the IP/UDP headers 310, 312 are the same. In all the proposals, each multiplexed stream is identified by a channel identifier 314 which is used to identify the payload belonging to that stream. The format and placement of the channel identifier differs between the different scenarios. A lookup table 316 can be used as a mechanism to multiplex or demultiplex IP packets.

One possible case of reusing the RTP multiplexing scheme for the BTS backhaul link is shown in FIG. 4. Much like in the AAL2 multiplexing case, there is an initial level of signaling which involves the SDU, packet control unit 400 PCU and the BTS (BTS includes the network interface board (NIB). This signaling sets up the two maps 402, 404 as shown in FIG. 4. In the upstream direction, the map 404 at the NIB enables the NIB to map from the multi-channel carrier card (MCC) (signal processor and channel coding card) device address that it receives in the packet from the BTS to the C_ID. At the packet control unit (PCU), a mapping is used to the SDU device address from the C_ID received on the link from the BTS. A router 406 suitably routes IS-634 packets to the appropriate SDU. The opposite occurs for downstream traffic. If the SDU sits on an IP network, this would mean recreating the UDP/IP header for the SDU device. This is very different from the process occurring in the Internet RTP multiplexing scheme. Recreating IP/UDP headers is a more complicated task than using the C_ID to identify one stream in a multiplexed RTP stream.

Another possibility of using RTP Multiplexing is shown in FIG. 5. In this scheme the SDU multiplexes the user information destined to one BTS into one multiplexed RTP stream 500 using routers 502 and 504. The disadvantages of this scheme are that the scheme cannot multiplex traffic destined to one BTS from different SDUs. In addition, the multiplexing gain may not be very high at the SDU. Typically there are two or three SDU serving 100 BTSs. Also, unless an RTP header is used for achieving synchronization between the SDU and the BTS, the RTP header is useless and one might have to implement real-time transfer control protocol (RTCP) at the SDU and the BTS to be able to use RTP.

Accordingly a need exists for a method and apparatus for reducing PPP packet sizes communicated over a communication link.

DETAILED DESCRIPTION OF THE PREFERRED EMBODIMENT

Briefly stated, a multiplexing layer exists between the PPP layer and a header compression layer, if a compression layer is used. A multiplexing scheme creates multiplexed PPP packets and demultiplexes the multiplexed PPP packets to reduce packet overhead. A method and apparatus obtains a plurality of point to point protocol (PPP) packets for communication over the communication link; and creates a frame containing at least multiplexed PPP packets from the plurality of PPP packets, PPP multiplexed identification data, (also referred to as a protocol type field value) and PPP packet delimitation data. To demultiplex the multiplexed PPP packets at a receiving end, a method and apparatus includes evaluating PPP packet delimitation data from the frame containing multiplexed PPP packets, PPP multiplexed identification data and PPP packet delimitation data; and demultiplexing the frame based on the PPP packet delimitation data to obtain separate PPP packets.

Figure 6:
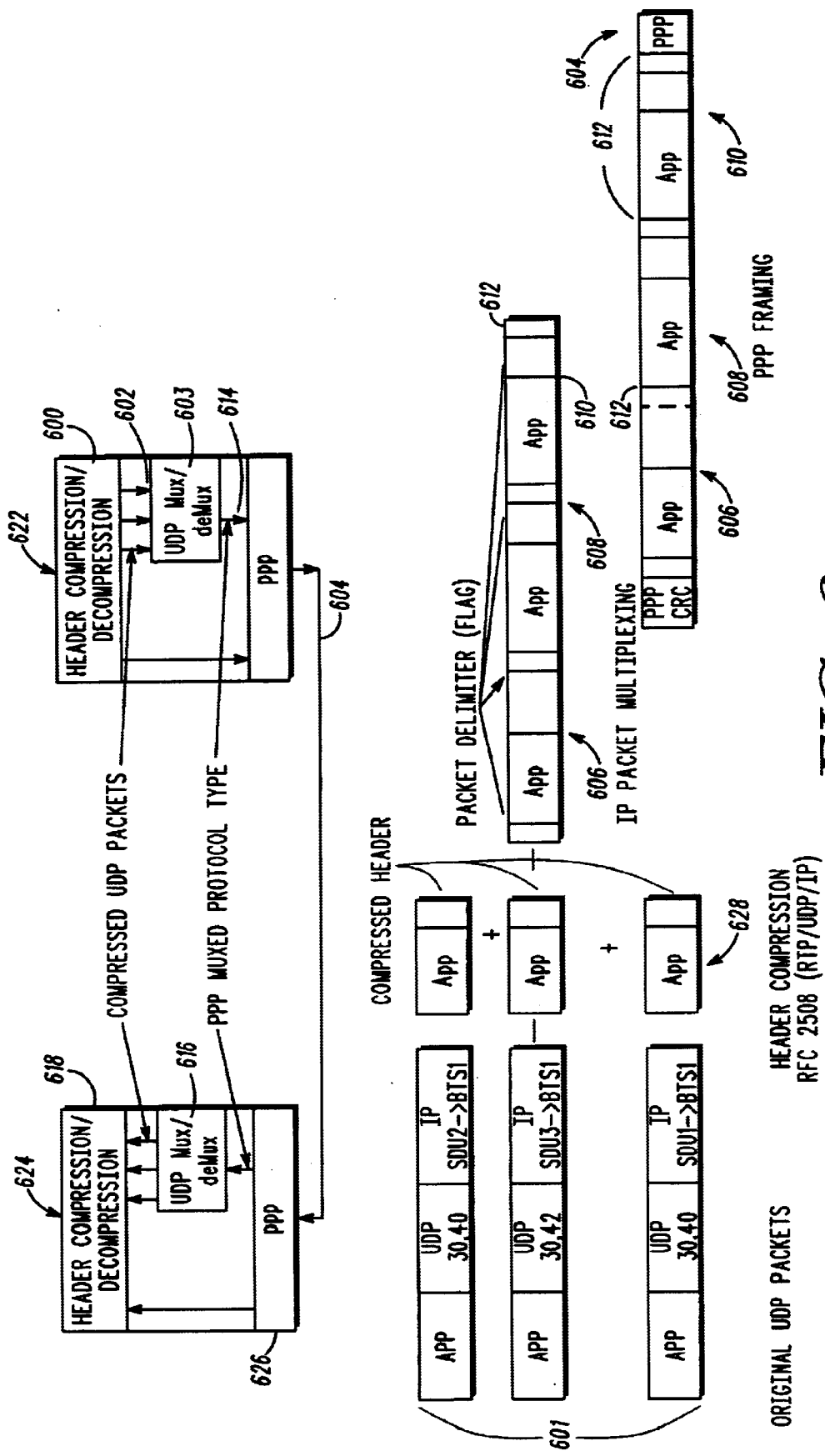
FIG. 6 is a diagram illustrating one example of a PPP multiplexing scheme and apparatus in accordance with one embodiment of the invention.

Referring to FIG. 6, an inventive stack for one way transfer is shown. In reality the compression/decompression and multiplexing/demultiplexing can occur in both directions. However, for purposes of illustration, only one direction is shown.

A point to point protocol packet communication apparatus such as a suitably programmed processing device or other suitable structure in a BTS, SDU, BSC or other device includes a point to point protocol packet header compressor 600 (and/or decompressor) having an input that receives point to point packets 601, such as original UDP packets, and an output that outputs compressed PPP packets 602. The apparatus includes a PPP packet multiplexer (and/or demultiplexer) 603 operatively coupled to the output of the PPP packet header compressor 600, and operative to create a frame 604 containing at least: multiplexed PPP packets from the plurality of PPP packets 606, 608 and 610, PPP multiplexed identification data 614 and PPP packet delimitation data 612.

A point to point protocol packet communication receiving apparatus that receives the frames 604 includes a PPP packet demultiplexer (and/or multiplexer) operatively responsive to frames 604 containing at least: the multiplexed PPP packets 606–610 from the plurality of PPP packets 601, PPP multiplexed identification data 614 and PPP packet delimitation data 612. The apparatus also includes a point to point protocol packet header de-compressor 618 (and/or compressor) having an input and an output, the input receiving a plurality of demultiplexed packets 620 from the PPP packet demultiplexer 616, the output providing decompressed PPP packets.

During the setup phase of point to point protocol (PPP), the two end-points 622 and 624 negotiate to support the multiplexed compressed UDP type of payload, through the IPCP protocol. During the data transfer phase a multiplexed compressed UDP PPP frame 604 will have a pre-assigned number 614 in the PPP protocol type field. On receiving a PPP frame with the protocol type field value 614 corresponding to multiplexed UDP packets, the PPP software 626 will pass the PPP frame to the UDP mux/demux software 616.

Multiple compressed UDP packets 628 are multiplexed into a PPP frame by using any one of the following three methods:

1. Packets separated by a flag: A unique flag byte 612 separates the different compressed UDP packets 606–610. Byte stuffing is used to ensure that the flag is unique and is a delimiter (i.e., delimitation data) between packets. This is a standard practice. This case is shown in FIG. 6.
2. Length byte prepended to each packet: Each compressed UDP packet is prepended with one byte which gives the length of the compressed UDP packet in bytes. One byte, with a length value of 1–64 bytes, is sufficient to provide the length of the compressed UDP packets.
3. Frame header at the beginning of the multiplexed compressed UDP packets: The value of the first byte, N, in the header denotes the number of compressed UDP packets. This is followed by N bytes, each representing the length of the different compressed UDP packets. Following this header are the compressed UDP packets.

The choice of one of the above scheme depends on the complexity of implementing the multiplexing/demultiplexing algorithms in software. The multiplexing scheme is unique in the context of PPP. The capacity improvements are significant. By using this scheme the overhead per IS-634 frame is (5/N+1) bytes, where N is the number of compressed UDP packets per PPP frame. The overhead due to IP/UDP is 2 bytes.

There is a trade-off between delay and reduction of overhead in multiplexing packets. A larger number of packets multiplexed into one frame, leads to smaller overhead per packet, but this increases the delay for the individual packets. There is also the issue of loss of packets. Since the PPP CRC is computed for the entire frame, a single error in the frame leads to the loss of all the packets in the PPP frame. For this reason, the size of the PPP frame should not be very large.

Sequenced delivery issues may arise in the general case of selective multiplexing. However, this is not an issue in the cellular network case, as the SDU only sends one user-frame per mobile to a BTS in one 20 msec period.

It will be recognized that additional delays caused due to PPP multiplexing may arise. For the staggered or the unstaggered case, there is no delay on the uplink. For a downlink communication, waiting for packets to fill a PPP frame can cause additional delay, however it is not clear that this additional delay would add to the end-end delay or the downlink delay for that matter. For instance, it may very well be that the packet which incurred an additional delay at the mux would have incurred a similar delay at the BTS in the unmuxed case. How these delays (at the BTS) and the muliplexer interact may not be significant.

For traffic coming from the core network to the backhaul link, the packets would be marked with packet priority data, such as different quality of service marking (QoS). Such QoS marking is known in the art. Thus at the output link of the router, the router will serve them to the Header compressor 600 and PPP layer in the order of the QoS marking. This will ensure that higher priority traffic will be transmitted on the T1 link before lower priority traffic. Moreover, since the packet muxing software has to be in close coordination with the Header compression software, only those compressed UDP packets could be passed to the muxing software whose quality of service (QoS) is low (the lower priority bearer traffic). The header compression software will need to keep track of the TOS byte of IP for each compressed UDP flow. This would mean that the muxing delay will only be introduced for lower priority QoS packets. There is any way an upper bound to the delay that PPP multiplexing can introduce; user frames have to be forwarded to the BTS before the 20 ms tick. Control traffic, probably TCP, will not be multiplexed and will be transmitted in a separated PPP frame.

Hence, QoS is being provided by the router. This is diffserv QoS. Multiplexing is done in a manner to ensure that higher priority traffic does not get penalized by the multiplexing delay in the PPP multiplexing layer.

A performance analysis to compute the capacity gains by using the different schemes described herein has been performed. Details of the performance analysis are provided in the following Table 1. The analysis estimates the capacity as a function of uplink delays measured from a BTS to the edge of a RAN network. In particular, capacity is defined as the maximum number of mobiles such that the backhaul delay is less than or equal to a delay threshold with probability greater or equal to 0.999.

Figure 1:
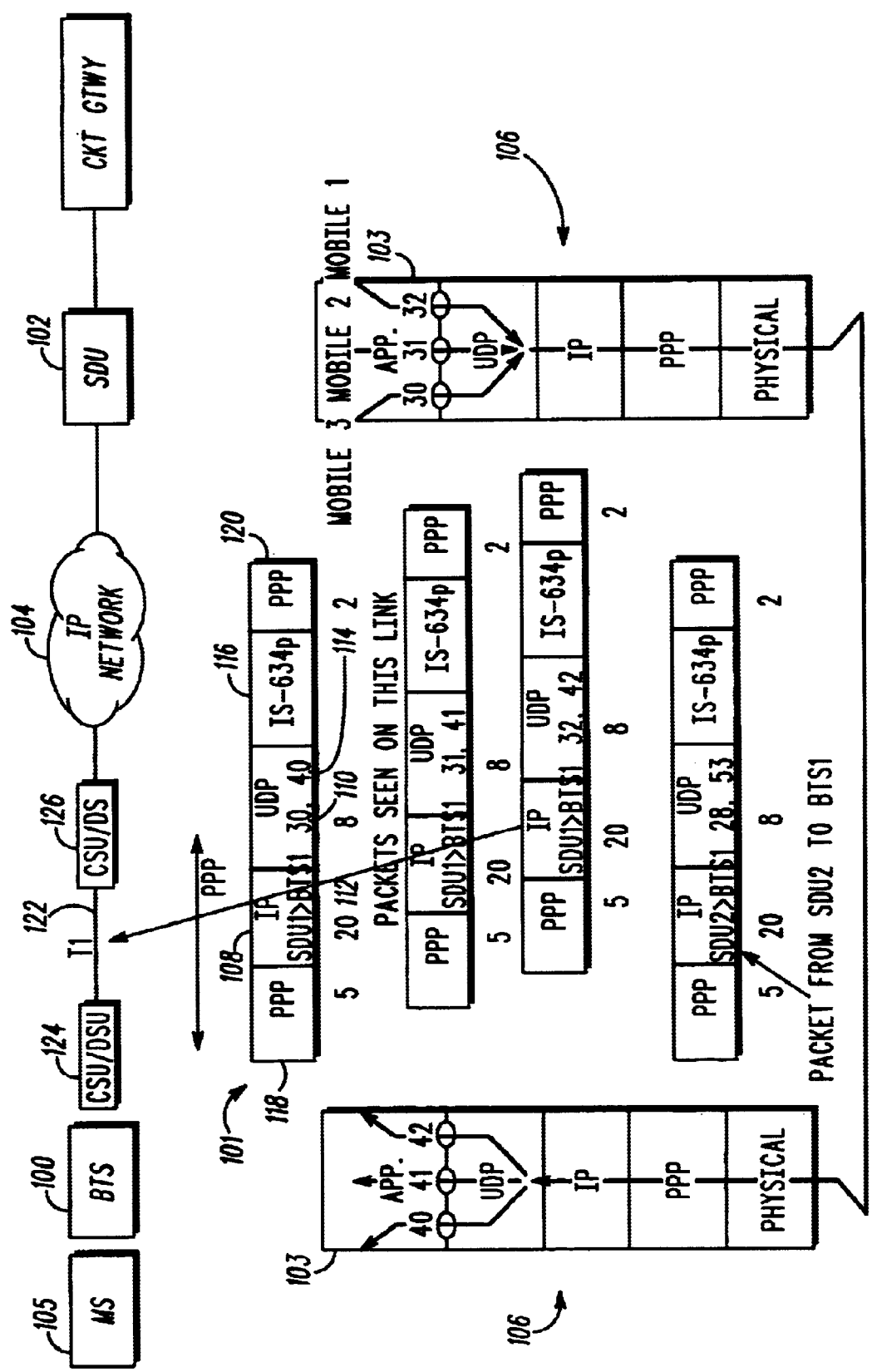
FIG. 1 is a diagram illustrating a prior art system employing IP protocol stacks between and SDU and a BTS.
Figure 2:
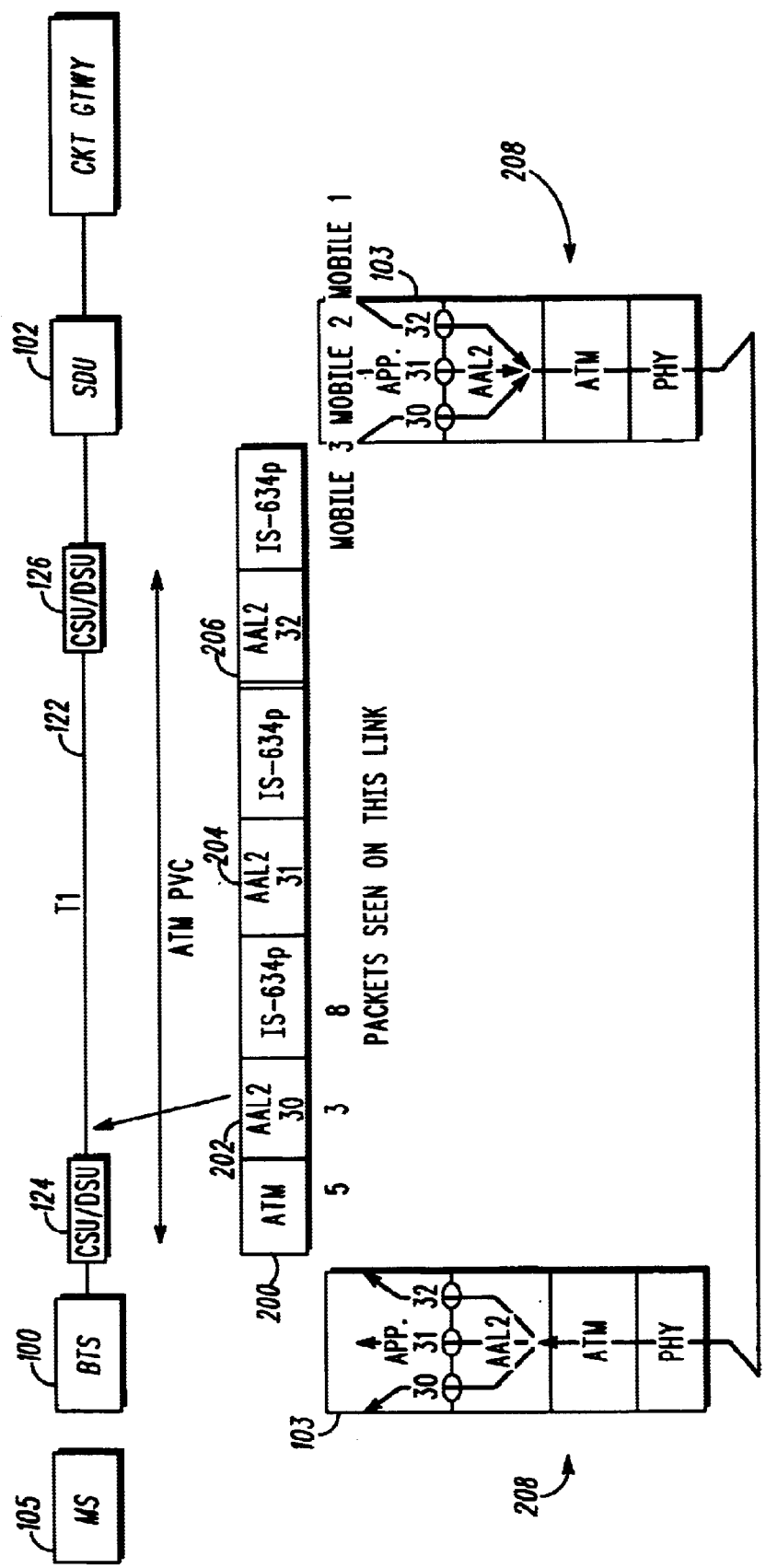
FIG. 2 is a diagram is a prior art system employing an asynchronous transfer mode protocol stack between an SDU and a BTS.
Figure 3:
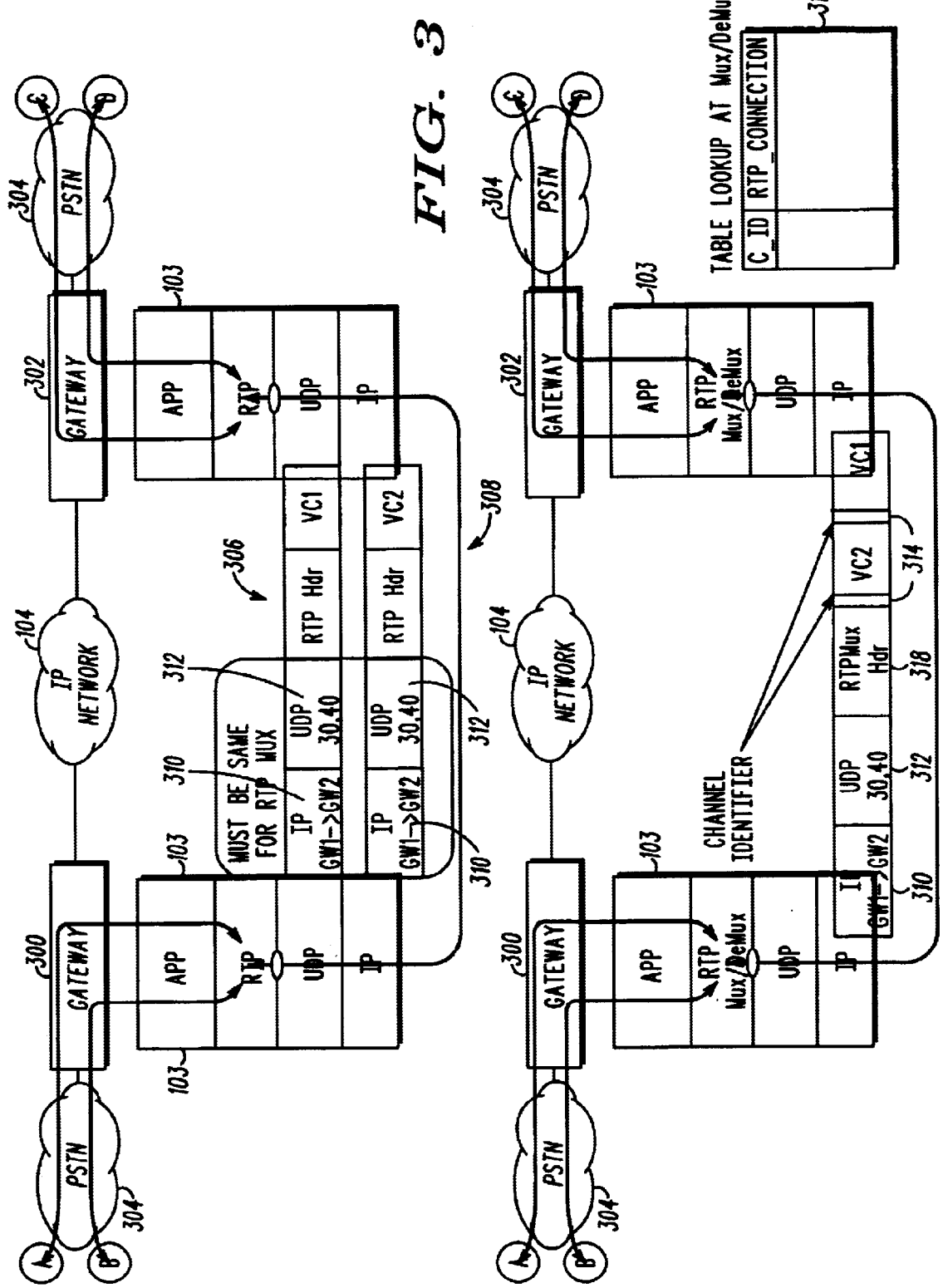
FIG. 3 is a diagram illustrating a prior art system employing real-time transfer (RTP) multiplexing.
Figure 4:
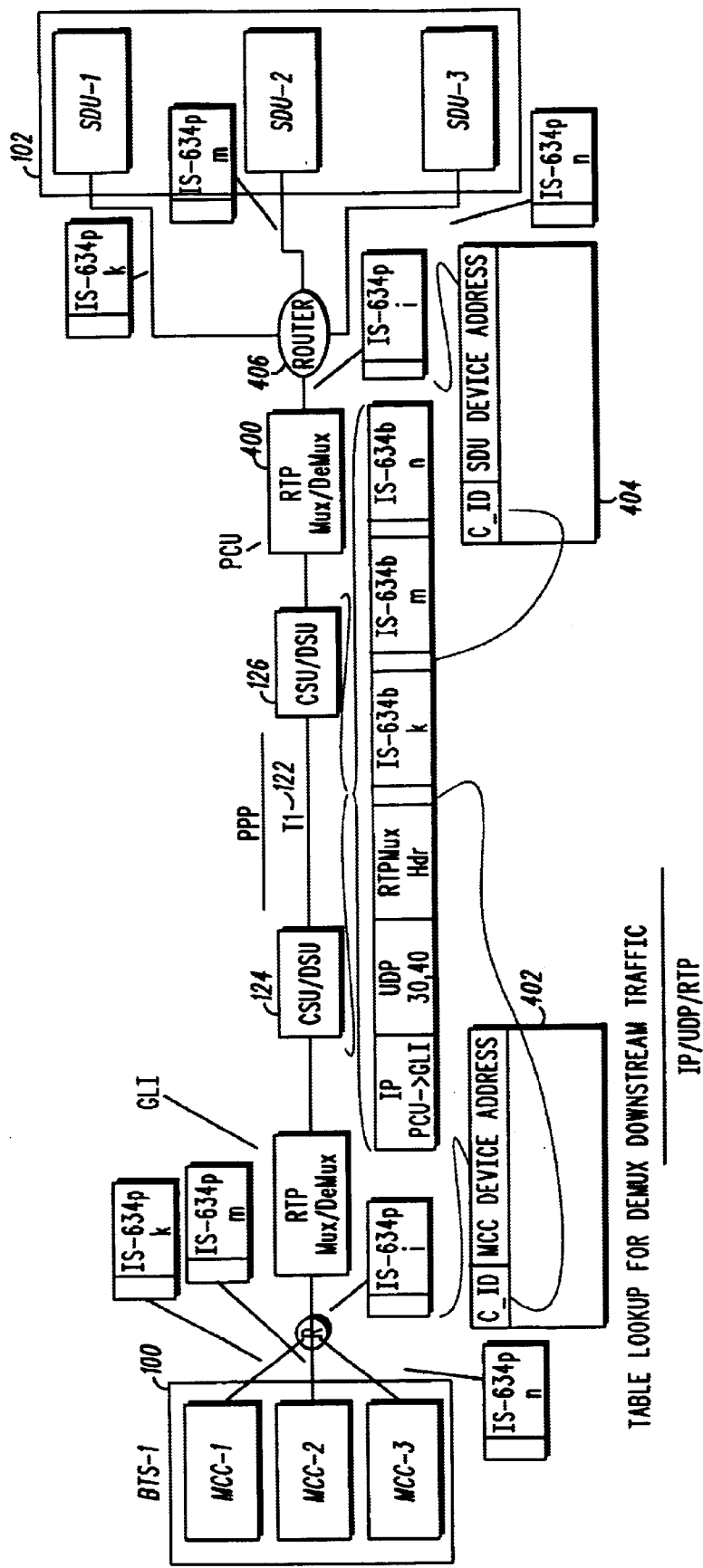
FIG. 4 is a diagram illustrating a possible system using RTP multiplexing.
Figure 5:
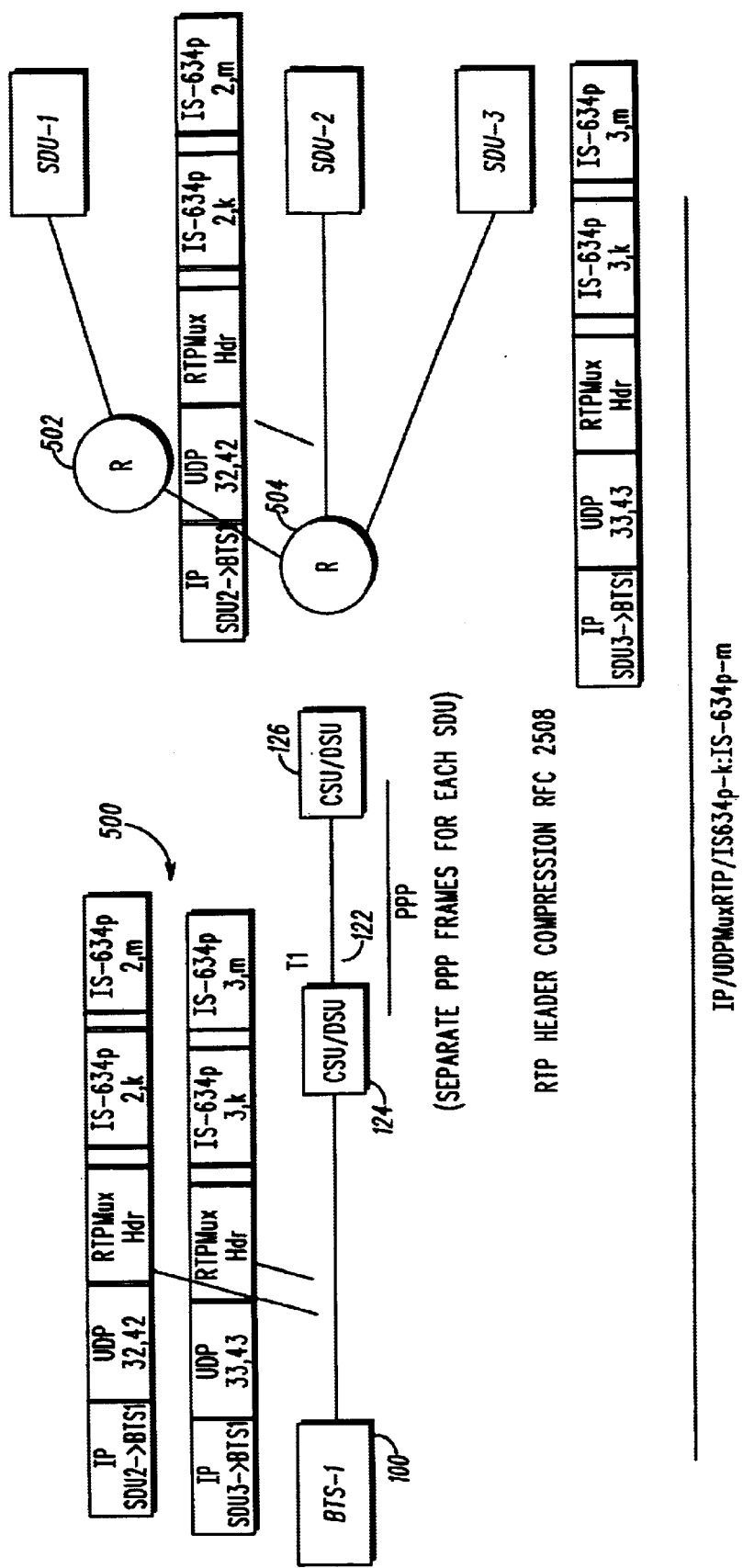
FIG. 5 is a diagram illustrating another possible system using RTP multiplexing.

The four different schemes compared are:
1. AAL-2 scheme;
2. UDP Header Compression: The UDP Header compression scheme compresses the headers of UDP packets over the T1 PPP link in accordance with RFC 2508 and RFC 2509;
3. RTP Multiplexing with RTP/UDP Header Compression: This is the scheme described above and illustrated in FIG. 4. In addition the RTP header is compressed based on RFC 2508; and
4. PPP Multiplexing Scheme: This is the new scheme which multiplexes multiple compressed UDP packets into a PPP frame.

There are two types of transmission schedules for mobiles to transmit to the BTS: non-staggered system and the staggered system. In the non-staggered system, all mobile node transmit their frames simultaneously every 20 ms. In the staggered system mobiles are divided into 16 groups; the frame-boundaries of transmission in the uplink direction for the groups are spaced 1.25 ms apart.

In the staggered uplink schedule, packets for mobiles belonging to a group are multiplexed into one PPP frame, for the RTP and PPP multiplexing schemes. Since the number of mobiles belonging to a group is variable and the size of packets transmitted by each mobile is also variable (due to variable rate coding), the size of the multiplexed packet is variable. However, for speeds up to T-1, it is not expected that the size of a PPP frame will have to be large enough to increase the frame error value significantly. Hence, it is recommended that that all users in the same group be placed in the same PPP frame to keep the implementation details simple. For the non-staggered uplink schedule, the size of the PPP frame is controlled. The size of the PPP frame has influence on the call-error characteristics. For example, if a large PPP frame is received in error, then all the calls multiplexed into the PPP frame are lost. However, smaller PPP frames lead to higher overheads. Analysis results for PPP frame sizes of 100, 200, 500 and 1500 byte PPP frames are presented.

The key assumptions in the analysis are:
1. PPP header 7 byte
2. Control overhead of 6 bytes per frame. This is a part of the payload and used to represent IS-634 or STRAU overhead
3. Compressed UDP/IP header 2 bytes
4. Compressed RTP/UDP/IP header 2 bytes
5. Each voice frame has a 2 byte RTP MUX id (when using RTP MUX)
6. Each voice frame has a 1 byte PPP MUX id (length byte) (when using PPP MUX)

The Table 1 below summarizes the results. Each entry in the table is the number of calls supported on the T1 backhaul for the four schemes for the stagger and no stagger configurations.

TABLE 1

Number of calls supported

| Scheme | Stagger (2 ms delay) Variable Frame Size (FS) | No Stagger (20 ms delay) | | | |
| --- | --- | --- | --- | --- | --- |
| | | FS: 100 bytes | FS: 200 bytes | FS: 500 bytes | FS: 1500 bytes |
| 1. AAL-2 | 145 | — | — | — | 166 |
| 2. UDP Header Compression* | 146 | 147 | 147 | 147 | 147 |
| 3. RTP Header Compression + RTP Mux | 192 | 187 | 196 | 201 | 204 |
| 4. PPP Mux | 182 | 181 | 187 | 191 | 193 |

*Frame size parameter is not applicable to the UDP Header Compression scheme (each frame contains one UDP packet).

Based on the above test, some key conclusions here are:
1. It has been found that PPP Multiplexing scheme provides 25–30% capacity gains over the standard UDP Header compression scheme.
2. It has been found that RTP Header compression along with RTP multiplexing can provide a 5–6% gain over PPP multiplexing scheme. However, RTP multiplexing is much more complicated than PPP multiplexing and RTP multiplexing is not a good solution to the problem of increasing the backhaul capacity.

To facilitate inter-manufacturer handoffs, the extensions to IPCP for negotiating the support of multiplexed compressed UDP packets should be standard among different BTS suppliers. Also, the protocol type number for PPP header assigned for UDP multiplexed payload should be standardized. Moreover, the IP addresses and UDP port numbers representing a unique call-context should be standard.

In an alternative embodiment, instead of multiplexing multiple UDP packets into one PPP frame, different packet types can be multiplexed into one PPP frame. If the unit being multiplexed also includes the PPP protocol type, then at demultiplexing, the protocol type information is also available.

Some key advantages of the herein described PPP multiplexing scheme incldue that a commercially available router feeding a T1 link with the PPP multiplexing software installed in the router and the BTS is all that is needed. Also, the PPP multiplexing scheme is simple to implement and does not introduce states at the two ends of the backhaul link. In addition, the PPP multiplexing scheme is totally transparent to the BTS and the SDU. The SDU and the BTS are totally unaware that the UDP packets are being compressed and then multiplexed. Further efficiency can be achieved on the BTS backhaul link by using additional standard compression schemes over PPP links. PPP multiplexing does not preclude the use of these compression schemes.

The BTS uses a message to inform the SDU about synchronization of the user-data to the 20 msec tick. Packet multiplexing introduces a variable unknown delay in the link between the SDU and BTS. Hence, the synchronization scheme may need to be modified. However, this problem is not unique to PPP multiplexing scheme. For a packet based transport used between the BTS and SDU, which introduces variable delays (due to queuing) to the packets headed to the BTS, the synchronization scheme based on circuit-switched technology is modified to account for these delays as known in the art.

As described herein, the disclosed method and apparatus multiplexes multiple compressed UDP packets into one PPP frame, thus amortizing the PPP overhead over multiple IS-634 frames. The multiplexing should occur at the Router feeding the Ti backhaul link. The point to point protocol (PPP) multiplexing method and apparatus reduces packet overhead. PPP multiplexing is employed in which multiple header-compressed UDP packets are multiplexed in a single PPP frame. This enables the PPP overhead (e.g., 7 bytes) to be amortized over multiple UDP packets. PPP multiplexed identification data (i.e., protocol type value) in the PPP header is used to indicate that the PPP frame contains multiplexed header-compressed UDP packets. Accordingly, the described PPP multiplexing scheme multiplexes multiple header-compressed UDP packets into a PPP frame, and provides significant capacity gains on T1 links connecting the BTS to the RAN network. The PPP multiplexing scheme is simple to implement requiring only minor modifications to the PPP software on the two ends of the T1 link.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method of communicating information over a communication link comprising the steps of:
   obtaining a plurality of point to point protocol (PPP) packets for communication over the communication link;
   creating a frame containing at least multiplexed PPP packets from the plurality of PPP packets, PPP multiplexed identification data and PPP packet delimitation data;
   evaluating PPP packet delimitation data from the frame containing at least said multiplexed PPP packets, said PPP multiplexed identification data and said PPP packet delimitation data; and
   demultiplexing the frame based an the PPP packet delimitation data to obtain separate PPP packets.

2. The method of claim 1 wherein the plurality of point to point protocol packets include a plurality of original user datagram protocol (UDP) packets, and wherein the method includes compressing header data of the plurality of UDP packets, prior to the step of creating the frame containing said at least multiplexed PPP packets.

3. The method of claim 1 including the step of separating multiplexed PPP packets by at least one unique flag byte and wherein the at least one unique flag byte serves as the delimitation data.

4. The method of claim 1 including the step of prepending at least one length byte to each multiplexed PPP packet and wherein the at least one length byte serves as the delimitation data.

5. The method of claim 1 including the step of applying a frame header as the delimitation data that represents a number of multiplexed PPP packets in the frame and data representing a length of each of the multiplexed PPP packets in the frame.

6. The method of claim 1 including the steps of:
   evaluating packet priority data associated with each of the plurality of PPP packets; and
   creating frames containing multiplexed PPP packets in a priority based fashion in response to the packet priority data.

7. The method of claim 1 including the step of sending control traffic associated with the frame containing PPP multiplexed packets, in non-PPP multiplexed frames.

8. The method of claim 1 wherein the step of creating the frame includes multiplexing different PPP type packets.

9. A method of communicating information over a communication link comprising the steps of:
   obtaining a plurality of original user datagram protocol (UDP) packets for communication over the communication link;
   compressing header data of the UDP packets;
   creating a frame containing at least multiplexed PPP packets from the plurality of UDP packets, PPP multiplexed identification data and PPP packet delimitation data;
   evaluating PPP packet delimitation data from the frame containing at least multiplexed PPP packets, PPP multiplexed identification data and PPP packet delimitation data; and
   demultiplexing the frame based on the PPP packet delimitation data to obtain separate compressed UDP packets.

10. The method of claim 9 including the step of decompressing each of the compressed UDP packets.

11. The method of claim 9 including the step of separating multiplexed PPP packets by at least one unique flag byte and wherein the at least one unique flag byte serves as the delimitation data.

12. The method of claim 9 including the step of prepending at least one length byte to each multiplexed PPP packet and wherein the at least one length byte serves as the delimitation data.

13. The method of claimed including the step of applying a frame header as the delimitation data that represents a number of multiplexed PPP packets in the frame and data representing a length of each of the multiplexed PPP packets in the frame.

14. The method of claim 11 including the steps of:
evaluating packet priority data associated with each of the plurality of PPP packets; and
creating frames containing multiplexed PPP packets in a priority based fashion in response to the packet priority data.

15. The method of claim 9 including the step of sending control traffic associated with the frame containing PPP multiplexed packets, in non-PPP multiplexed frames.

16. The method of claim 9 wherein the step of creating the frame includes multiplexing different PPP type packets.

17. A point to point protocol packet communication apparatus comprising:
a point to point protocol packet header compressor having an input and an output, the input being operatively coupled to receive a plurality of point to point protocol (PPP) packets for communication over a communication link;
a PPP packet multiplexer operatively coupled to the output of the PPP packet header compressor, and operative to create a frame containing at least; multiplexed PPP packets from the plurality of PPP packets, PPP multiplexed identification data and PPP packet delimitation data;
a PPP packet demultiplexer operatively responsive to frames containing at least the multiplexed PPP packets from the plurality of PPP packets, PPP multiplexed identification date and PPP packet delimitation data; and
a point to point protocol packet header de-compressor having an input and an output, the input being operatively coupled to receive a plurality of demultiplexed packets from the PPP packet demultiplexer, the output providing decompressed PPP packets.

18. The apparatus of claim 17 wherein the apparatus is a base site controller in a wireless communication system.

19. The apparatus of claim 17 wherein the apparatus is a base transceiver station in a wireless communication system.

20. The apparatus of claim 17 wherein the plurality of point to point protocol packets include a plurality of original user datagram protocol (UDP) packets.

21. The apparatus of claim 17 wherein the PPP packet demultiplexer evaluates PPP packet delimitation data from the frame containing at least multiplexed PPP packets, PPP multiplexed identification data and PPP packet delimitation data; and demultiplexes the frame based on the PPP packet delimitation data to obtain separate PPP packets.

22. The apparatus of claim 17 wherein the PPP packet multiplexer separates multiplexed PPP packets by at least one unique flag byte.

23. The apparatus of claim 17 wherein the PPP packet multiplexer prepends at least one length byte to each multiplexed PPP packet.

24. The apparatus of claim 17 wherein the PPP packet multiplexer applies a frame header containing data representing a number of multiplexed PPP packets in the frame and data representing a length of each of the multiplexed PPP packets in the frame.

25. The apparatus of claim 17 wherein the PPP packet multiplexer evaluates packet priority data associated with each of the plurality of PPP packets; and creates frames containing multiplexed PPP packets in a priority based fashion in response to the packet priority data.

* * * * *

UNITED STATES PATENT AND TRADEMARK OFFICE
CERTIFICATE OF CORRECTION

PATENT NO. : 6,721,333 B1  
DATED : April 13, 2004  
INVENTOR(S) : Milton et al.

It is certified that error appears in the above-identified patent and that said Letters Patent is hereby corrected as shown below:

Column 9,  
Line 1, "of claimed" should read -- of claim 9 --.

Signed and Sealed this

Twenty-second Day of June, 2004

JON W. DUDAS  
*Acting Director of the United States Patent and Trademark Office*